United States Patent [19]

Dove et al.

[11] Patent Number: 4,725,850

[45] Date of Patent: Feb. 16, 1988

[54] ELECTROMAGNETIC HEAD WITH SEPARATE ADDRESSABILITY RESOLUTION AND IMAGING RESOLUTION FUNCTIONS

[75] Inventors: Derek B. Dove, Mount Kisco; Kurt R. Grebe, Beacon; George E. Keefe, Montrose; Edward J. Yarmchuk, Mahopac, all of N.Y.

[73] Assignee: International Business Machines Corporation, Armonk, N.Y.

[21] Appl. No.: 27,710

[22] Filed: Mar. 19, 1987

[51] Int. Cl.⁴ .............................................. G01D 15/00

[52] U.S. Cl. .................................................... 346/74.5

[58] Field of Search ................. 346/74.5, 139 C, 74.2; 101/DIG. 5; 400/119; 358/301, 295; 360/122, 125, 126, 127; 428/908; 427/131, 48; 29/603, 602 R, 606, 607, 608, 609

[56] References Cited

U.S. PATENT DOCUMENTS

| | | | |
|---|---|---|---|
| 2,841,461 | 7/1958 | Gleason | 346/74.5 |
| 3,890,623 | 6/1975 | Schmid et al. | 346/74.5 |
| 4,380,768 | 4/1983 | Palombo et al. | 346/74.5 |

FOREIGN PATENT DOCUMENTS

| | | | |
|---|---|---|---|
| 2116482 | 9/1983 | United Kingdom | 346/74.5 |

*Primary Examiner*—Arthur G. Evans

*Attorney, Agent, or Firm*—Perman & Green

[57] ABSTRACT

An electromagnetic printhead is fabricated with a common flux returning backplate and an array of writing elements extending from the common backplate. The writing elements consist of large pedestals and small pedestals. The placement of the large pedestals provides addressability resolution; the small pedestals provide imaging resolution. The large pedestals accept electromagnetic flux from addressing conductors and transfer the flux through the respectively related small pedestals to an image receptor. There are several fabrication techniques which are eased by the separation of addressability resolution and imaging resolution, primarily because the wide separation of the large pedestals required for the addressing conductors mandate relatively massive removal of material and thus suggest relatively low precision machining techniques. The imaging resolution requires both high spacial precision and accurate dimension control, normally achievable by relatively high precision techniques. With the functions addressability resolution and imaging resolution functions separately provided, the best and most economical techniques may be used for each. The magnetic flux path for recording may be either vertical or in-plane, and the flux return may be common via the relatively low reluctance path provided by very large area paths through the mass of nonferromagnetic material to the common flux returning backplate. This simplified printhead lends itself to the use of standard flexible circuit fabrication techniques for the addressing conductors.

36 Claims, 7 Drawing Figures

FIG. 4
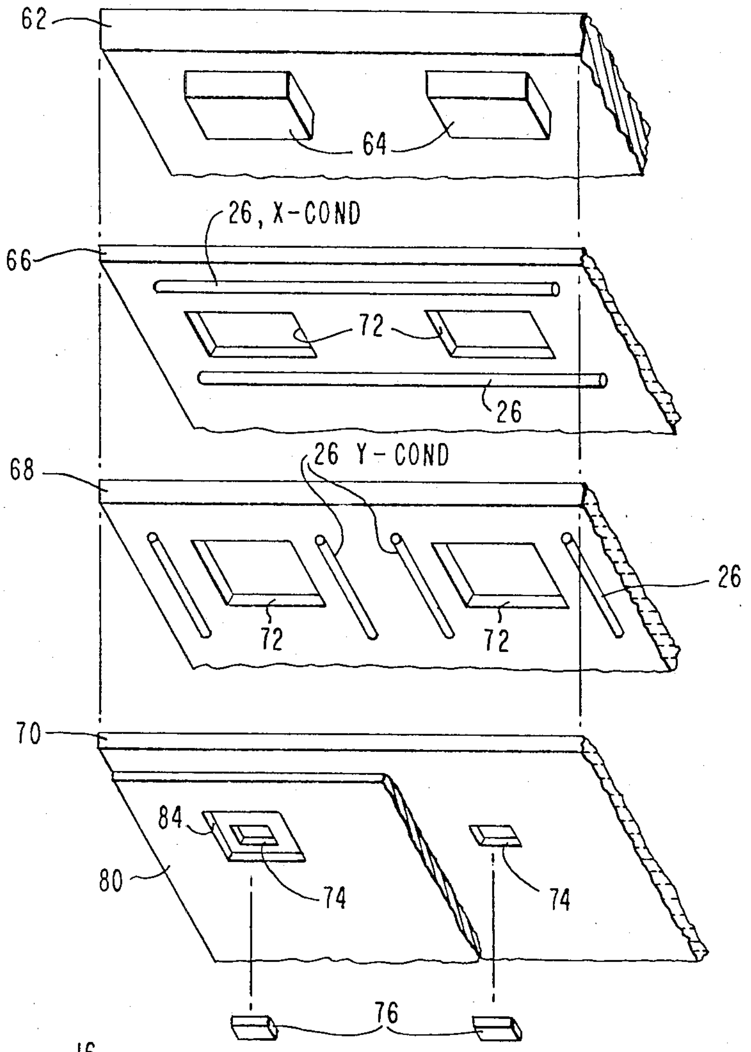
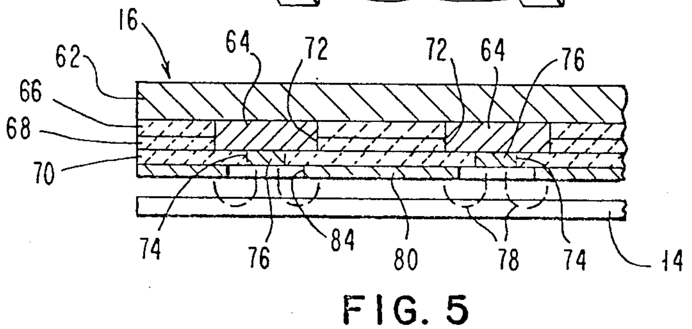
FIG. 5

ELECTROMAGNETIC HEAD WITH SEPARATE ADDRESSABILITY RESOLUTION AND IMAGING RESOLUTION FUNCTIONS

BACKGROUND OF THE INVENTION

This invention relates to electromagnet heads and, more particularly, to a head in which the addressability resolution function and the imaging resolution function are separated, permitting construction with differing degrees of precision of large pedestals for addressability resolution and respectively related small pedestals for imaging resolution.

Magnetographic printing systems employ a print head, a magnetizable medium, and a toner for producing an image on a sheet of paper or other hard copy material. The magnetic medium may be carried upon a drum or upon a tape. Typically, the magnetic medium is coated upon the drum or the tape. The print head comprises an array of magnet cores which are interlaced with a set of electric conductors. The magnetic cores, in cooperation with the electrical conductors, form electromagnets which are selectively energizable by application of electric currents to selected ones of the electric conductors.

The print head is positioned alongside of the surface of the magnetic medium to allow each of the electromagnets to impart a magnetic field to the medium in a region directly beneath the terminus, or print-element portion, of a magnetic core, thereby to write a mark upon the magnetic medium. Energization of various ones of the electromagnets results in the formation of a set of marks on the magnetic medium, which set of marks constitute an image written on the medium by the print head. The magnetic image is rendered visible by toning with magnetic ink, which ink is attracted by the local magnetic fields of the magnetically written regions. The toner is then transferred to the paper to produce the image on the paper.

In many printing applications, it is desirable to produce a high-resolution image. By way of example, such high-resolution imaging is required in the printing of small detailed characters, such as a 9-point text. A further example is the case of the printing of a picture wherein fine detail is to be rendered. In order to accomplish fine-resolution printing rapidly, it is desirable to construct a print head having an array of many closely spaced small print elements, the size of the print elements being commensurate with the smallest detail to be rendered.

A problem arises in the construction of a print head of closely-spaced high-resolution print elements. The problem is that toner is most strongly attracted to the periphery of the imaged region on the image receptor, leaving the center lightly toned. A gross example is the grey area which appears in the middle of a large black area in a photocopy. When two pel images overlap, the toner adheres only to the periphery of the double image, leaving a double center untoned. It therefore is extremely advantageous for pel spots to be placed closely but not to overlap. Heretofore, both the print elements and their corresponding electrical activation conductors had to be constructed using expensive high-resolution processing technology, and since the conductors have to be electrically continuous over relatively long distances, this high-resolution processing had to be done over a large area. These considerations have made large, page-wide, high-resolution print heads expensive to produce.

SUMMARY OF THE INVENTION

The aforementioned problem is overcome and other advantages are provided in a magnetographic printing system employing a print head constructed in accordance with the invention. The print head is provided with many fine-dimensioned print elements which extend from relatively widely spaced magnetic cores, arranged in a two-dimensional array, to produce a fine-resolution detailed image upon a magnetic medium for transfer to a paper or other hard copy. In addition, the print head is fabricated of a flexible support material which permits the print head to be molded to conform to the shape of a magnetic medium, such as a magnetic medium coated upon a circular drum, or a flat surface on a tape. The print head can also be formed of rigid material, if molding is not required, for example, as in the case of a flat printing surface.

An object of this invention is to provide a high-resolution magnetic print head that can easily be fabricated using conventional processing technology, and wherein the basic design is extendable in print resolution and print area, to be economically used in a broad performance range of magnetic printers.

The object of the invention can be accomplished by a construction of the print head from a set of flexible laminae of an electrically-insulating, nonmagnetic material such as polyimide. The electrical conductors of the print head are deposited photolithographically upon the laminae which serve to insulate one set of electric conductors from the other set of electric conductors. Magnet cores are developed within apertures of the laminae. The laminae are then secured to each other adhesively to produce a laminated or layered structure which holds the magnet cores and the electric conductors securely in position.

A feature of the invention is the construction of the layered structure of a bottom support plate and two sheets of the foregoing material wherein each of the sheets carries one set of the electric conductors, and the support plate serves to precisely position print elements at the ends of the magnet cores. Only the support plate and magnetizable material disposed within apertures of the support plate need be manufactured to a high degree of precision. Apertures formed in the two sheets may be structured as clearance holes to a relatively low degree of precision, the clearance holes surrounding the magnet cores. Each of the magnet cores comprises an enlarged skirt portion and the aforementioned print-element portion which are joined together by a pedestal portion. The formation of the pedestal portion and the skirt portion may be accomplished by a relatively low-precision process. The skirts of the various magnet cores extend transversely across a top surface of the print head to abut each other and, thereby, form a continuous layer of magnetizable material which serves as a path for the conduction of magnetic flux through the individual magnet cores. This continuous layer of magnetizable material, because of its large area, also serves to provide a low reluctance path for flux returning through non-magnetic regions of the print head, thus eliminating the need for additional magnetic flux return structures. A return path for the magnetic flux may be provided through a base element behind the magnetic medium, such as an iron drum which may be employed to support the magnetic medium. Alternatively, a return path for the magnetic flux can be provided by a further layer of magnetizable material disposed along a bottom surface of the print head and having apertures surrounding the print elements of the respective cores to form a gap at each of the print elements. Fringing fields at the gaps interact with the magnetic medium to produce in-plane recorded spots. In the case of the return path being provided by a base behind the magnetic medium, the magnetic field passes normally from the cores through the magnetic medium for recording vertically oriented spots.

In the foregoing construction of the invention, the construction is accomplished by a series of steps which are economical to perform and which provide the desired fine resolution high-quality printing capability. In a preferred embodiment of the invention, the construction begins by forming the pedestals on a layer of magnetizable material by means of a metal forming process such as stamping, machining, plating, or etching. The first sheet is provided with a set of apertures and a first set of electric conductors deposited on the bottom surface of the first sheet. The first sheet is then placed upon the bottom surface of the layer of magnetizable material with the pedestals protruding through the apertures of the first sheet. The second sheet is formed similarly with the conductors arranged substantially perpendicularly to the conductors of the first sheet. The second sheet is placed against the first sheet with the top surface of the second sheet resting against the conductors of the first sheet. The pedestals protrude through the apertures of the second sheet. The second sheet serves to insulate the first set of conductors from the second set of conductors. The support plate is prepared with apertures and with magnetizable material of the print elements disposed in the apertures. The support plate is then placed upon the second sheet with the print elements contacting the pedestals of the respective cores. In the foregoing construction process, adhesives are placed between the respective laminae, namely the upper layer of magnetizable material, the first sheet, the second sheet, and the support plate so as to securely bond the lamina together. By constructing the sheets and the plate of flexible material, the finished print head will be flexible enough to be easily conformed to the surface of the printing medium. The conformed print head can now be used either in direct contact or close proximity with the print medium.

In the preferred embodiment, the print head is constructed the full width of both the print medium and the paper to be printed. This allows high imaging accuracy and imaging speed, resulting in high resolution, high speed printing.

BRIEF DESCRIPTION OF THE DRAWING

The aforementioned aspects and other features of the invention are explained in the following description, taken in connection with the accompanying drawings wherein:

FIG. 4 is an exploded view showing the component parts in a construction of the print head of FIG. 1 in accordance with a preferred embodiment of the invention, the view showing bottom surfaces of the parts to describe a mode of assembly;

FIG. 5 is a cross-sectional view of a print head structure constructed by the process of FIG. 4;

DETAILED DESCRIPTION

Figure 1:
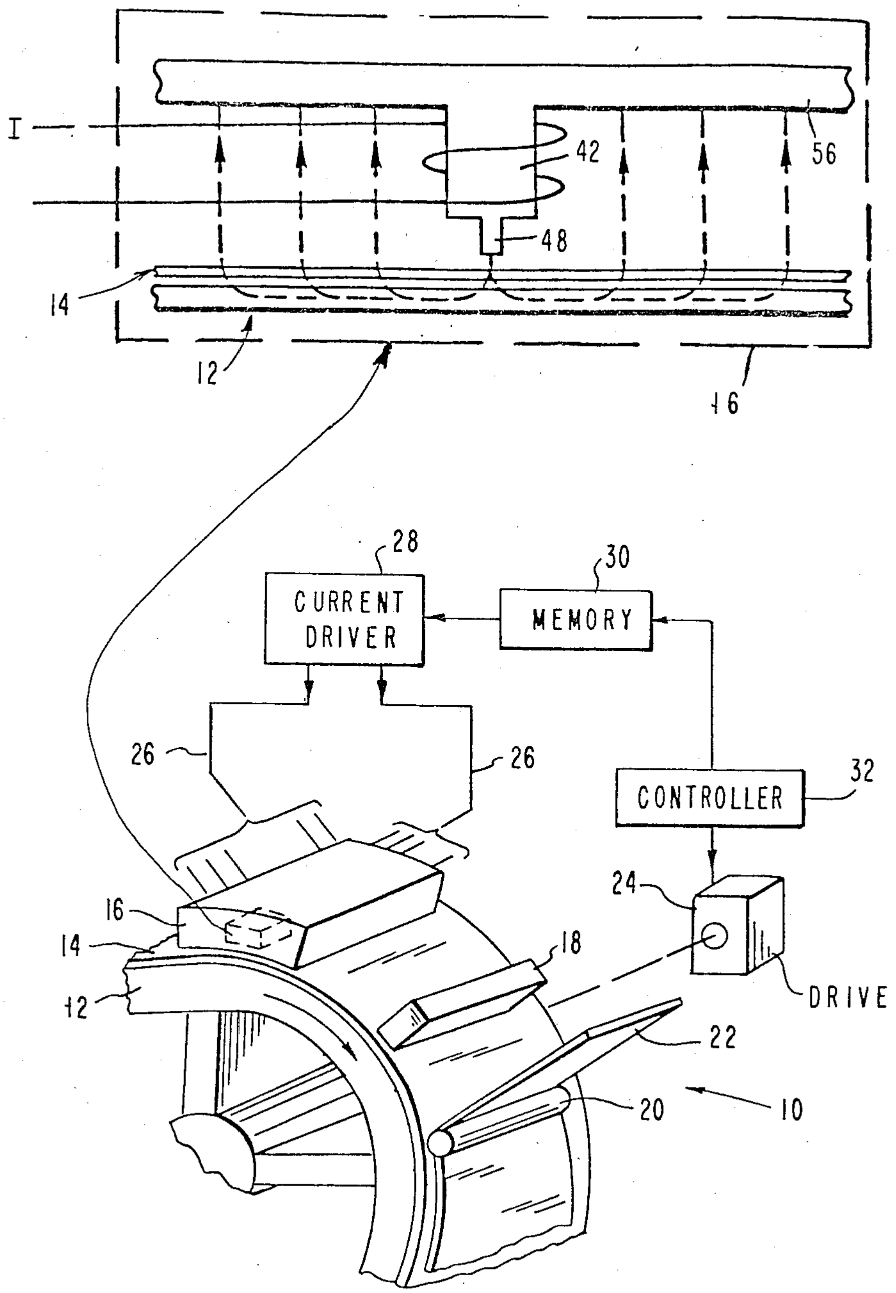
FIG. 1 is a stylized view of a procedure of magnetrographic printing, with an enlarged inset showing the separate addressability resolution and imaging resolution functions inherent in the invention.

FIG. 1 shows a simplified view of a magnetographic printing system 10 for demonstrating use of a print head constructed in accordance with the invention. The system 10 employs a drum 12 having a magnetic medium 14 emplaced on the drum 12 in the form of a coating. Also included within the system 10 are a print head 16 embodying the invention, a toner dispenser 18, and an assembly including a roller 20 for guiding a sheet 22 of paper along the medium 14 during rotation of the drum 12. A drive unit 24 rotates the drum 12 to carry the magnetic medium 14 from the print head 16 past the dispenser 18 to the sheet 22 at the roller 20.

In operation, the print head 16 prints marks magnetically upon the medium 14. The imprinted region of the medium 14 is passed by the drum 12 to the dispenser 18 for receiving toner, and then passed by the drum 12 further to the paper sheet 22 for transferring the image to the paper sheet 22. The toner from the dispenser 18 adheres to locations on the medium 14 at sites wherein there is a change of magnetic field, which changes in magnetic field are brought about by magnetic fields impressed upon the medium 14 by the print head 16. Thereby, the locations of particles of the toner conform to the image. Upon transference of the toner to the paper sheet 22, the image appears on the paper sheet 22.

The print head 16 includes electric conductors 26 arranged in two sets, one set being composed of x conductors and the other set being composed of y conductors, where x and y represent axes of a reference coordinate system to be described subsequently. The conductors 26 are energized with current by a current driver 28 which includes individual well-known drive circuits (not shown) for imparting pulses of current to respective ones of the conductors 26. A memory 30 stores information for directing the selection and pulsing of individual electromagnets of the print head 16, as will be described below, for generating individual pixels of the image. The memory outputs command signals to the current driver 28 for activating the requisite ones of the conductors 26 for printing a signal or other indicia. Operation of the memory 20 is coordinated with the rotation of the drum 12 by a controller 32 coupled to both the memory 30 and the drive unit 24. Coordination of the drum rotation and the activation of the print head 16 is well known and is currently employed in magnetographic printers.

The enlarged inset in FIG. 1 shows a small portion of common flux returning backplate 56, representative large pedestal 42 for the addressability resolution function, and small pedestal 48 for the imaging resolution function at the same pel location. The flux return path is shown by arrows.

Figure 2:
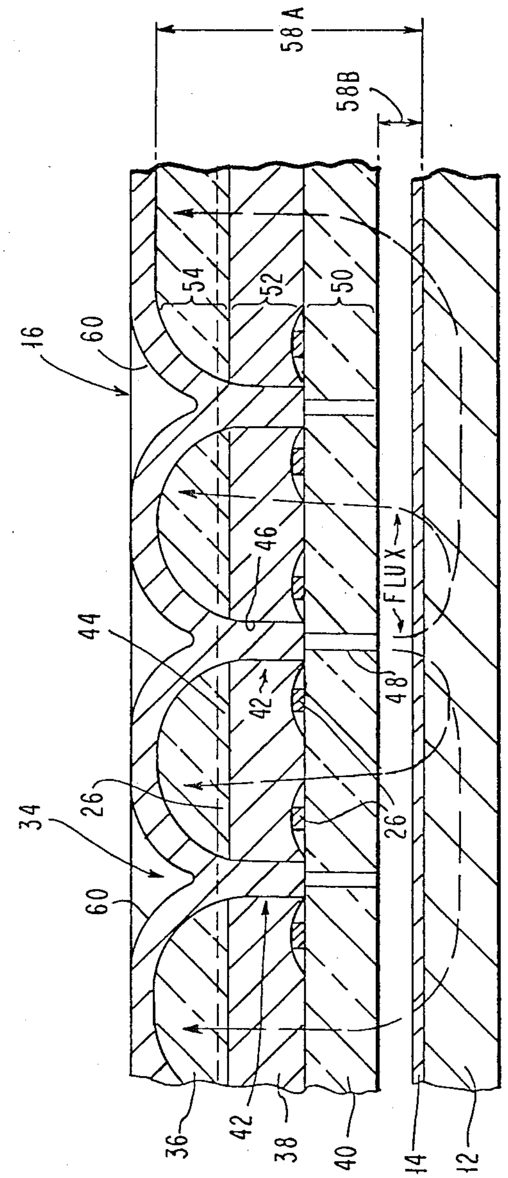
FIG. 2 is a stylized sectional view of a print head taken along an axial plane of a drum in FIG. 1.
Figure 3:
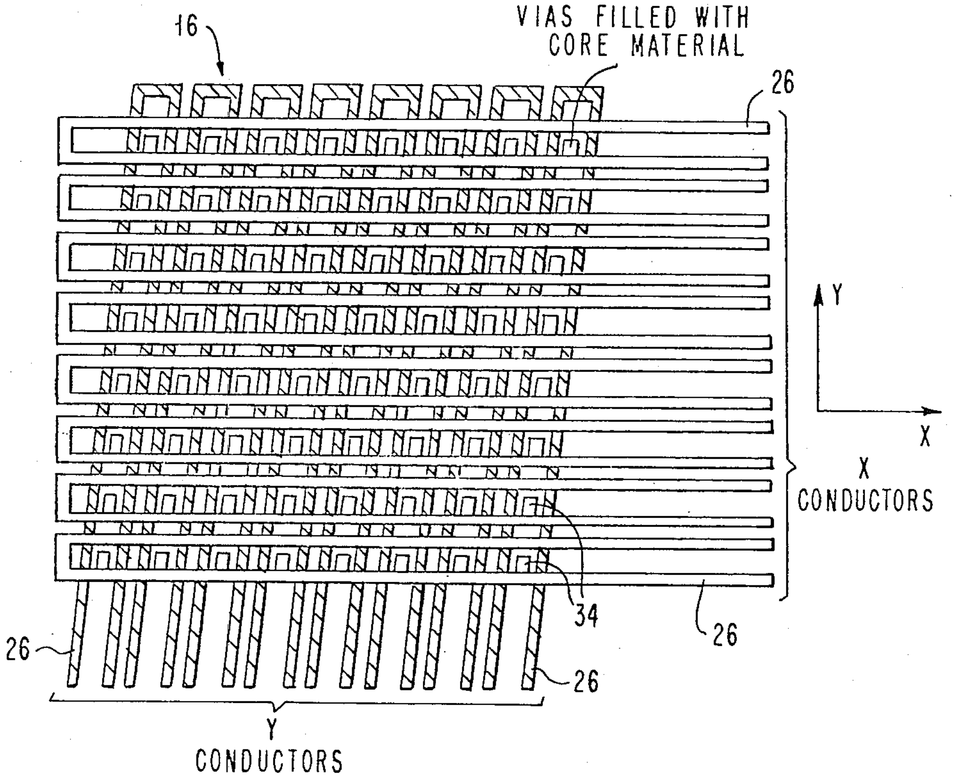
FIG. 3 is a diagrammatic view of an array of magnet cores and conductors of the print head of FIG. 1.

With reference also to FIGS. 2 and 3, there is provided further detail in the manner of construction of the print head. FIG. 2 shows a stylized sectional view of the print head 16, and FIG. 3 shows a layout of conductors and magnet cores of the print head 16. The print head 16 comprises a set of electromagnets 34 arranged in two dimensions represented by an x coordinate and a y coordinate. The x coordinate is oriented parallel to an axis of rotation of the drum 12 and the y direction is perpendicular to the x direction and parallel to the tangential velocity of the medium 14 (FIG. 1) as it passes beneath the head 16 (FIG. 1). The electromagnets 34 are arranged in rows parallel to the x coordinate, and in columns wherein the columns are inclined slightly to the y coordinate so as to permit an interlacing of successive lines of printing to fill in the complete portion of an image as the medium 14 passes beneath the head 16. For ease of reference, the part of the head 16 facing the medium 14 will be referred to as the bottom of the head 16, with the opposite side being referred to as the top of the head 16. It is to be understood, however, that the system 10 may be positioned in some other orientation, in which case the terms "top" and "bottom" refer to the parts of the print head 16 which face away from and towards the magnetic medium 14.

In accordance with a feature of the invention, the print head 16 is constructed as a set of laminae or strata in a composite laminated structure permitting the construction of the electromagnets 34 as a set of magnet cores developed within apertures of the laminae, and with windings of the electromagnets being constructed by locating individual ones of the conductors 26 alongside the magnet cores. The conductors 26 are secured in their respective positions by being placed on interfaces between individual ones of the laminae. By way of example, one mode of construction is described now with reference to the simplified representation of the composite structure of the head 16 as presented in FIG. 2.

The laminae in the composite structure of the head 16 comprise a first sheet 36 and a second sheet 38 of a flexible, nonmagnetic, electrically-insulating material such as polyimide, one such commercially available material being marketed under the name of Kapton. The first sheet 36 is placed on top of the second sheet 38. A support plate 40 is placed beneath the second sheet 38 and is composed of the same material as the second sheet 38. Improved wear resistance of the support plate surface may be achieved with a suitable material which is not necessarily an insulating material. Metallic wear resistant materials such as tungsten are suitable for this application. In the event conducting material is used, an extra insulating layer having suitable apertures can be added between the conductors on the lower sheet 38 and the support plate 40. The electromagnets 34 comprise magnet cores 42 which pass through apertures 44 in the first sheet 36, through apertures 46 in the second sheet 38, and through apertures 48 in the support plate 40.

The support plate can be eliminated entirely by forming the print elements 50 directly on the bottoms of the pedestals 52 by means of plating or machining (electric discharge machining is capable of producing such structures using photolithographically defined apertures). The spaces between the fine print elements 50 can be filled with a suitable wear resistant epoxy to complete the structure.

Each of the magnet cores 42 is an assembly of three portions, namely, a print-element portion 50, a pedestal portion 52 extending upwardly from the print element portion 50, the pedestal portion 52 fanning outwardly and upwardly into a skirt portion 54 of the assembly of the magnet core 42. The skirt portions 54 of adjacent cores 42 join together to form a layer 56 of magnetizable material. The material of the cores 42 and of the layer 56 is, preferably, a low coercivity magnetic material such as permalloy which, as is well known, comprises an alloy of nickel and iron. The thickness of the layer 56 is in the range of approximately 1–4 mils so as to permit flexing of the composite structure when it is desired to mold the head 16 to conform to a curved surface, such as the curved surface of the drum 12. No such molding is necessary in the event that the head 16 is to have a flat bottom surface.

The set of conductors 26 parallel to the x coordinate are deposited photolithographically upon the bottom surface of the first sheet 36. The set of conductors 26 parallel to the y coordinate are deposited photolithographically upon the bottom surface of the second sheet 38. The second sheet 38 is secured by an adhesive to the first sheet 36 and to the support plate 40. The second sheet 38, by virture of its location between the x conductors and the y conductors, serves to insulate the set of x conductors from the set of y conductors. The conductors 26 pass alongside the apertures 44, 46, and 48, but are withdrawn back from the edges of these apertures a sufficient distance to insure electrical isolation of the conductors 26 from the metallic material of the cores 42. This insures insulation of the conductors 26 from each other.

In the construction of FIG. 2, only the apertures 48 in the support plate 40 need be produced to a high level of precision to place the print-element portions 50 of the respective cores 42 in the precise positions of the two-dimensional array so as to insure accurate formation of the image. The other apertures 44 and 46 simply provide space for the magnetizable material of the cores 42 to provide magnetically conducting paths between the top layer 56 and the respective print-element portions 50. Whether the apertures 44 and 46 be slightly offset from the aperture 48, or whether the sizes of the apertures 44 and 46 be somewhat larger or smaller than those depicted in FIG. 2 has essentially an insignificant effect on the conduction of the magnetic field to the print-element portions 50. The conductors 26 are sufficiently close to the magnet cores 42 to induce the magnetic fields therein upon generation of currents within respective ones of the conductors 26 independently of the precise positions and sizes of the aperture 44 and 46. Therefore, the composite structure depicted in FIG. 2 demonstrates an important feature of the invention in which only the formation of the support plate 40 and the print-element portions 50 therein need be constructed to a high degree of precision, while the remaining portions of the head 16 can be constructed to a much lower level of precision.

In the example of construction in FIG. 2, the magnetic fields provided by the magnet cores 42 pass normally through the magnetic medium 14 into the drum 12, the drum 12 serving as a magnetically conducting base or plate for helping complete the magnetic circuit. The magnetic circuit is completed by lines of flux distributed about a gap 58A between the drum 12 and the top layer 56. The flux passes from drum 12 through non-magnetic layers 36, 38, and 40, of the gap 58A back to magnetic layer 56. Because of the large area between the pedestals of a layer 56 there is no need for an additional magnetic structure to serve as a flux return path from drum 12. In accordance with a feature of the invention, as embodied in a preferred embodiment of the invention, the ratio of the entire area of the top layer 56 to the length of the gap 58A is greater than, or approximately equal to, the ratio of the cross-sectional area of a print-element portion 50 to the length of a gap 58B between the bottom end of a print-element portion 50 and the surface of the drum 12. This relationship between the ratios is readily attained in the preferred embodiment of the invention wherein the x dimension of the head 16 is sufficiently long to encompass the width of the magnetic medium 14 upon which the printing is to be performed. The relationship of the two ratios provides that the magnetic reluctance of the return path of the magnetic flux, between the drum 12 and the top layer 56 is smaller than to the reluctance to the flux path across the gap 58B.

For the dimensions used, the reluctance of this portion of the circuit is much smaller than that from the gap at the end of the print element. The former is proportional to the thickness of the layers 36 through 40 (plus recording medium and air gap) divided by the total area of the top layer 56 between the pedestals, while the latter is proportional to the thickness of the recording medium plus air gap divided by the cross-sectional area of the print element.

It is noted that the stylized representation of FIG. 2 is presented simply to demonstrate the general arrangement of the components, and that details in the mode of construction employed in the preferred embodiment of the invention will be described subsequently with reference to FIG. 4. The structure portrayed in FIG. 2 can be formed by preparing the laminae 36, 38, and 40 with the apertures 44, 46, and 48 etched therein, respectively, and with the conductors 26 formed photolithographically on the bottom surfaces of the first sheet 36 and the second sheet 38. Thereupon, the apertures 48 in the support plate 40 are filled with magnetizable material by deposition to build up the print-element portion 50 of the magnet cores 42. The second sheet 38 is then secured adhesively on top of the support plate 40 with the apertures 46 in registration with the apertures 48. Further core material is then deposited into the apertures 46 to form the pedestal portions 52 of the magnet cores 42. Finally, the first sheet 36 is secured adhesively on top of the second sheet 38 with the apertures 44 in registration with the apertures 46, and still more magnetic material is deposited within the apertures 44 to form the skirt portion 54 of each of the magnet cores 42. During the deposition of the magnetizable material for formation of the skirt portion 54, the outer regions of the skirt portions 54 contact each other to form the top layer 56. Depressions 60 may be left on top of the skirt portions 54 during the deposition of the material of the skirt portions 54. The resultant structure is as shown in FIG. 2.

FIG. 4 shows the steps in the process of construction of the print head 16 in accordance with the preferred embodiment of the invention. The structure resulting from the steps of FIG. 4 is shown in sectional view in FIG. 5, the structure including various layers of the print head 16 in accordance with the preferred embodiment of the invention.

With reference to both FIGS. 4 and 5, the construction process begins by forming a layer 62 of magnetizable material such as the aforementioned nickel-iron alloy. Pedestals 64 are formed by a metal forming process such as stamping, machining, plating, or etching techniques upon the bottom side of the layer 62.

The construction continues with the fabrication of a first sheet 66, a second sheet 68, and a support plate 70 of electrically-insulating nonmagnetic material such as polyimide. Apertures 72 are formed within the first sheet 66 and the second sheet 68 by etching using photolithographic techniques or mechanical means such as stamping or drilling. The apertures 72 are positioned in registration with the pedestals 64 and are slightly larger than the pedestals 64 to permit insertion of the pedestals 64 through the corresponding apertures 72 of the first sheet 66 and the corresponding apertures 72 of the second sheet 68. The height of each pedestal 64 is at least equal to the sum of the thicknesses of the first sheet 66 and the second sheet 68 so as to provide a substantially flush fit with the bottom surface of the second sheet 68 upon emplacement of the sheets 66 and 68 upon the layer 62. The view of FIG. 4 shows the bottom surfaces of the layer 62, the sheets 66 and 68, and the support plate 70 so as to facilitate a description of the emplacement of a pedestal 64 within an aperture 72.

In accordance with a feature of the invention, the construction process provides for the forming of apertures 74 within the support plate 70, the apertures 74 being much smaller than the apertures 72. The apertures 74 are performed by etching using photolithographic techniques. Print elements 76 in the form of round, square, or rectangular plugs are deposited within the apertures 74. The material employed in fabricating the print elements 76 and the pedestal 64 can be the same as the magnetizable materials of the layer 62. However, the magnetic material used in print element 76 need only to be low coercivity and may be chosen for its wear and fabrication properties.

The apertures 74 are positioned in alignment with the corresponding pedestals 64. However, in accordance with the invention, the cross-sectional dimensions of the apertures 74, and of the print elements 76 are much smaller than the corresponding dimensions of the pedestals 64 with the result that a relatively low amount of precision of alignment of the apertures 74 and the pedestals 64 is required. A relatively high amount of precision is required in the formation of each of the apertures 74 to insure that the print elements 76 are correctly positioned and sized to provide for highly accurate printing by the print head 16. Even if the pedestals 64 are somewhat misaligned from the precise positions of the print elements 76, the lines of flux 78 of a magnetic field emerging from print element 76 will not be effected.

During the fabrication of the sheets 66 and 68, electrical conductors 26 are deposited thereon in the form of thin strips of metal, such as copper. In the first sheet 66, the conductors 26 are deposited along the bottom surface alongside the apertures 72, the conductors 26 extending in the x direction. In the second sheet 68, the conductors 26 are deposited on the bottom surface of the sheet 68, the conductors 26 extending alongside the apertures 72 in the y direction. In the fabrication of both the sheets 66 and 68, the conductors 26 are formed by well-known photolithographic techniques. Only portions of the various segments of the conductors 26 in the sheets 66 and 68 are shown in FIG. 4, it being understood that the completed conductors 26 extend past many of the magnetic cores in accordance with the format shown in FIG. 3. The top layer 62, the two sheets 66 and 68, and the support plate 70 are secured to each other with the aid of an adhesive, disposed along their respective interfacing surfaces, to permanently hold these components in their respective positions.

The structure of the head 16 of FIG. 5 may be placed in a mold to introduce a curvature to conform the bottom surface of the print head 16 to the shape of a magnetic medium 14 which is to receive the printing.

After completion of each of the sheets 66 and 68, and the support plate 70 with the print elements 76 therein, the sheets 66 and 68 and the plate 70 are assembled with the layer 62 to provide an integral assembly of layers wherein the first sheet 66 is placed with its top surface contiguous the bottom surface of the layer 62, the second sheet 68 is placed with its top surface contiguous the bottom surface of the first sheet 66, and the support plate 70 is placed with its top surface contiguous the bottom surface of the second sheet 68. The apertures 72 serve as vias through which the pedestals 64 extend to contact the support plate 70 and the respective print elements 76 therein. The support plate 70 precisely positions the print elements 76 and securely holds them contiguous to the respective pedestals 64. The pedestal 64 with their corresponding print elements 76 constitute magnetic cores which function as the cores of electromagnets activated by currents passing through the conductors 26 as has been described hereinabove with reference to FIG. 3.

By way of alternative embodiments of the invention, a bottom layer 80 of magnetizable material, preferably the same material as is employed in the construction of the pedestals 64, is deposited by photolithographic techniques upon the bottom surface of the support plate 70 to provide a return path for the magnetic flux 78. As shown in FIG. 5, the flux 78 jumps over an airgap 82 between a print element 76 and the bottom layer 80, and then passes via non magnetic layers 70, 68 and 66 of the head 16 back to the top layer 62. The bottom layer 80 is shown partially formed in FIG. 4 and includes an aperture 84, formed by photolithographic techniques, the aperture 84 being larger than the aperture 74. The difference in size between an aperture 84 and its corresponding aperture 74 provides for the air gap 82 between a print element 76 and the bottom layer 80. Bottom layer 80 can also be formed into shapes to provide a small air gap 82 area for higher resolution in plane imaging.

The conductors 26 are located sufficiently close to the apertures 72 for applying a magnetic field to each of the cores of the electromagnets, the conductors 26 being spaced back a sufficient distance from the apertures 72 to clear the respective pedestals 64, and thereby insulate the conductors 26 from the electrically conducting material of the pedestals 64. The polyimide material of the first sheet 66 electrically insulates the x-conductors 26 from the metallic layer 62, and the polyimide material of the second sheet 68 insulates the x-conductors 26 from the y-conductors 26. The polyimide material of the support plate 70 electrically insulates the y-conductors 26 from the electrically conducting metal of the bottom layer 80.

As shown in FIG. 5, lines of flux 78 carried by the bottom layer 80 and a print element 76 spread out in the region of a gap 82 and enter the magnetic medium 14 positioned alongside the bottom layer 80 of the head 16. Herein, gap 82, the distance between element 76 and the bottom layer 80 determines the resolution of the print head 16 in an in-plane printing operation. In the event that the print head 16 is constructed without the bottom layer 80, then, as was explained with reference to FIG. 2, the magnetic flux flows perpendicularly through the magnetic medium 14 to return via the magnetizable material of the drum 12. Thus, in the absence of the bottom layer 80, the printing resolution is determined by the cross-sectional dimensions of a print element 76.

Figure 6:
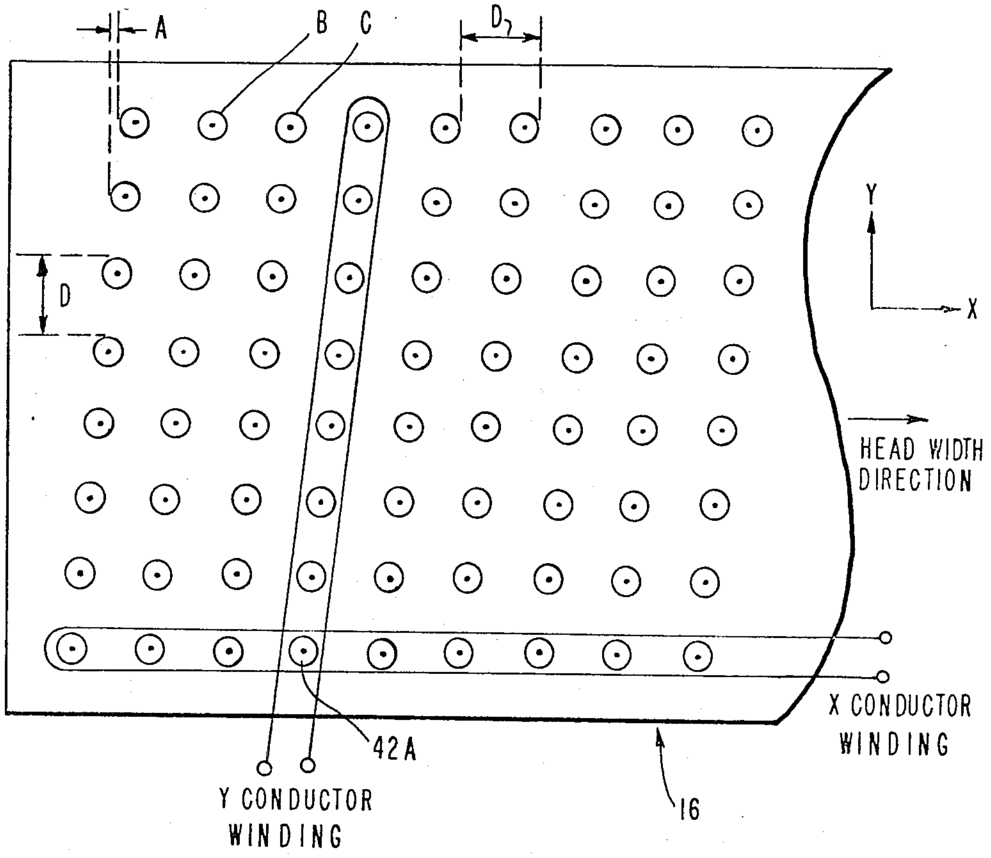
FIG. 6 is a layout with dimensions of the print head constructed in accordance with the preferred embodiment.

FIG. 6 shows a further layout of the components of the print head 16 including dimensions employed in the preferred embodiment. Assuming a round shape, by way of example as shown in FIG. 6, the following dimensions provide a highly precise print head 16 while permitting ease of manufacture, these dimensions being as follows: Dimension A is 4 mils, this being the indentation between successive rows of the print head 16, and allowing for 250 picture elements (pixels) per inch. Dimension B is 10 mils, this being the diameter of a pedestal 64. Dimension C is 2 mils, this being the diameter of a print element 76. Dimension D is 32 mils, this being the spacing between corresponding parts of successive print elements in a row and in a column of the print head 16. The angle of orientation of the y-conductor winding is seen to be less than 90 degrees relative to the x-conductor winding to accommodate for the indentation, dimension A, between successive rows of the print head 16. The thickness of each of the sheets 66 and 68 is in the range of 0.5–10 mils. The thickness of the support plate 70 is greater than the diameter of the print element 76, preferably a factor of 2 or more. The top layer 62 has a thickness of approximately 1–4 mils. The diameter of a pedestal 64, in general, is greater by a factor of 4–5 times the diameter of the corresponding print element 76. Eight rows of print elements are employed in the head, as shown in FIG. 6, to fill in all spaces of an image as the medium 14 moves past the head 16 (FIG. 1). The x dimension of the head 16 is much longer than the y dimension, and may extend the full width of print medium 14 to obviate the need for two-dimensional movement between the head and the medium for more rapid printing.

The electric currents provided by the current driver 28 and the memory 30 of FIG. 1 provide for 9 ampere-turns for activating a magnet core 42. This is accomplished by impressing a current of +3 or −3 amperes on the x-conductor 26, and a current of +6 amperes on the y-conductor 26 to a magnet core 42A (FIG. 6) which is being activated. Pulsed drive currents of these levels are easily obtained using commercially available power FET devices. This provides the aforementioned 9 ampere turns for activation of the selected core 42A, while other cores receive only 3 ampere turns. The 9 ampere turns on core 42A provide a field sufficient to overcome the coercivity of the print medium under core 42A, whereas those cores that receive 3 ampere turns produce less than the required field for switching the print medium under them which therefore remain unchanged. This provides a threshold ratio of 3:1 for reliability in selectively magnetizing the print medium.

By way of further embodiments of the invention, it is noted that the construction of the magnetic cores to provide for the highly precise print-element region and the pedestal region of lower precision is not limited to the specific configuration of the electric conductors such as that disclosed above with reference to FIG. 3. For example, if desired, by use of conductors in the form of fine wires, a separate conductor can be employed for magnetizing each individual one of the magnetic cores, in which case the current necessary for magnetization would be applied along the individual wire rather than by use of the x-y raster shown in FIG. 3. Alternatively, by way of further example, the set of x-conductors may be retained and individual wires employed for activating each of the cores in lieu of the y conductors. In this latter example, the x conductors would carry a part of the necessary magnetization current while the individual y conductors would carry the balance of the required magnetization current for magnetizing a selected one of the magnetic cores.

It is also noted that the configuration of the magnetizable material, wherein an array of pedestals, such as the pedestals 64 of FIGS. 4 and 5, extends from a top layer, such as the layer 62, can be formed by yet a further process as will be described with reference to FIG. 7 wherein a slab of bulk ferromagnetic material is shaped to provide the desired configuration of magnetizable material. Such shaping can be accomplished by a milling operation, by an etching procedure using photolithographic procedures, or both of the foregoing shaping processes. In the fabrication process of FIG. 7, only a portion of the procedure involves high precision steps, the balance of the steps being formed with low precision so as to produce a print head such as the print head 16 in FIGS. 1, 2, and 5, with a capacity for printing with high resolution while minimizing the cost of manufacture.

Figure 7:
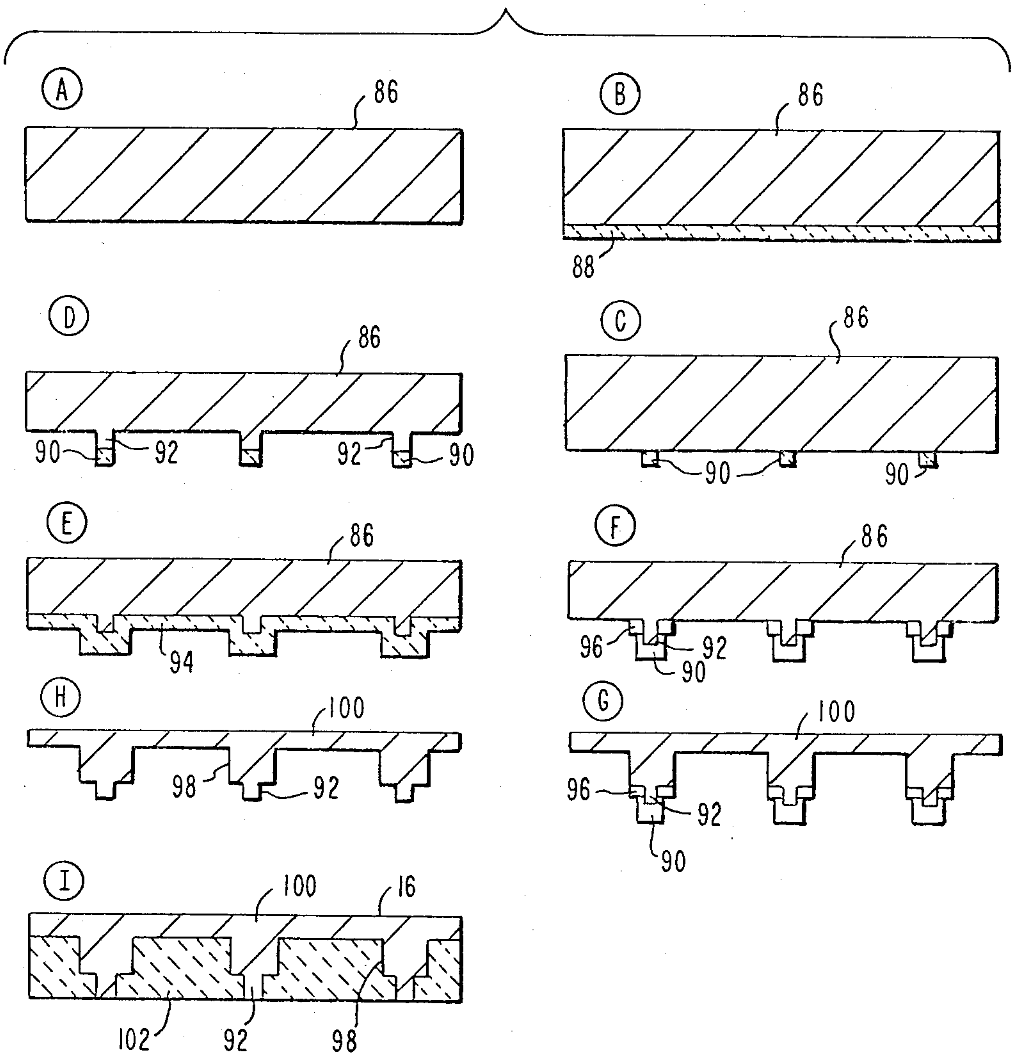
FIG. 7 shows a further method of manufacture of a print head employing removal of bulk magnetizable material from a slab of the material.

With reference to FIG. 7, there is shown a fabrication procedure involving nine steps, identified as A–I for constructing the print head 16. In step A, the process begins with a slab 86 of magnetizable material such as the aforementioned nickel-iron alloy. The slab 86 is coated with a layer 88 of photoresist material in step B. The layer 88 is etched by conventional means employing a mask (not shown), in step C, to leave protective caps 90 along the bottom surface of the slab 86.

The slab 86 is then etched, in step D to remove material along the bottom surface of the slab 86, the etching proceeding at all portions which are unprotected by the caps 90. This leaves an array of small pedestals 92 extending outwardly from the bottom surface of the slab 86 at the sites of the caps 90. The small pedestals 92 correspond to the print-element portion 50 of FIG. 2 and the print-element 76 of FIG. 4. Additional photoresist material is then deposited along the bottom surface in step E resulting in the formation of a layer 94. In step F, the layer 94 is etched away by use of a mask (not shown) leaving collars 96 around the bases of the small pedestals 92. The views in each of the steps of FIG. 7 are sectional views taken along one row of magnetic cores of the head 16, it being understood that the collars 96 encircle the corresponding small pedestals 92.

The foregoing steps A–D have been performed with photolithographic techniques employing a relatively high level of precision. The following steps E–I can be performed with substantially lower precision. In step G, the exposed regions of the slab 86 are deeply etched to form large pedestals 98 which support the small pedestals 92, the small pedestals 92 extending from the bottom ends of the large pedestals 98. The remaining portion of the slab 86 has the form of a top layer 100 which joins the large pedestals 98. The procedure then continues with step H wherein the photoresist material of the collars 96 and the caps 90 is removed by etching, and step I wherein the voids between the larger pedestals 98 and the small pedestals 92 are filled with a layer 102 of nonmagnetic, electrically-insulating material such as polyimide. It is readily seen by inspection, that the structure in step I is equivalent to the structure set forth in FIGS. 2 and 5. With respect to the conductors 26 of FIGS. 2, 3 and 4, these conductors are inserted during step I by partially filling the voids with the polyimide material of the layer 100, then inserting electrical conductors, such as the y conductors, and then further filling the voids with the polyimide material followed by insertion if the other conductors, such as the y conductors. Thereupon the filling of the voids is completed with the polyimide material of the layer 102. The conductors have been omitted in FIG. 7, it being understood that the arrangement of the conductors therein would be similar to that of FIG. 2. By alternately applying the polyimide material and the conductors, the two sets of conductors are insulated from each other and from the magnetizable material of the pedestals 98 by the polyimide material.

The procedures for forming the large pedestals 98 and small pedestals 92 can be varied, using photolithography with etching, electroerosion, cutting by precision saws, or other metal forming techniques as appropriate to the economics of providing the appropriate precision.

In view of the foregoing description, it is apparent that the physical structure of the print head and the mode of assembly of the print head provides for a highly accurate printing process while maintaining the cost of manufacture of the print head.

The addressability resolution is determined by the placement of the large pedestals 98. This provides interlacing density of print elements as the image receptor moves by. The imaging resolution is determined by the size of the small pedestals 92 and the precision of their placement.

The addressability function is provided by placement of the large pedestals 98 which may be produced by an appropriate procedure. The print imaging resolution is provided by small pedestals 92 which may be produced by an appropriate procedure which may differ from that for producing the large pedestals 98.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

Having thus described our invention, what we claim as new, and desire to secure by Letters Patent is:

1. A print head comprising:

a two-dimensional array of magnet core assemblies, each of said core assemblies having an axis to be directed toward a magnetic medium upon which printing is to be done by said print head, each of said core assemblies extending along its axis from a print-element portion of relatively small cross-sectional dimensions to a skirt portion of relatively large cross-sectional dimensions via a pedestal portion of intermediate cross-sectional dimensions;

a set of x-conductors disposed parallel to one dimension of said array, and interlacing each of said core assemblies;

a set of y-conductors disposed parallel to a second dimension of said array, and interlacing each of said core assemblies; the conductors of each of said sets, upon being selectively energized with electric currents, activating selected ones of said core assemblies to print a mark on said magnetic medium;

a support plate of nonmagnetic electrically-insulating materials securing the print-element portions of the respective core assemblies with high precision at respective locations in said array; and wherein the skirt portion of one core assembly joins the skirt portion of an adjacent core assembly in said array to form a layer of magnetizable material to serve as a magnetic flux conduction path;

said print head being constructed by a process comprising the steps of:

constructing a support plate of nonmagnetic electrically-insulating material with apertures therein positioned with relatively high precision at sites corresponding to the locations of said print elements in said array;

constructing first and second insulating sheets with apertures therein located at sites corresponding to the locations of the print elements, the apertures in said insulating sheets being larger than the apertures in said support plate and being formed with a relatively low precision;

depositing first and second ones of said sets of conductors on the bottom sides respectively of said first and of said second insulating sheets, the conductors in each of said sheets being spaced apart from the apertures in respective ones of said sheets to insure electrical isolation from the core assemblies while being sufficiently close to the core assemblies for magnetically exciting the core assemblies;

assembling said support plate, said first sheet with the conductors thereon, and said second sheet with the conductors thereon into a composite layered structure wherein the bottom side of said first sheet contacts the top side of said second sheet and the top side of said support plate contacts the bottom side of said second sheet; and depositing a layer of magnetizable material within the apertures of said support plate to form the print-element portion of each core assembly, further depositing said magnetizable material within the apertures of said second and said first insulating sheets to form the pedestal portions of each of said core assemblies, and continuing depositing said magnetizable material upon the top surface of said first sheet to form the skirt portions of said core assemblies.

2. A print-head according to claim 1 wherein the construction process further comprises a step of applying a second magnetizable layer on a bottom side of said support plate while retaining clearance of magnetizable material around each of said print elements to form a gap in a magnetic circuit threading each of said core assemblies upon energization of corresponding ones of said conductors, said second magnetizable layer forming a part of a magnetic flux conduction path of said print head.

3. A print-head according to claim 1 wherein said support plate and each of said insulating sheets are formed of a flexible material, said construction process further comprising a step of molding said print head to conform to a shape of a surface of a magnetic medium upon which said print head is to print.

4. A print-head according to claim 3 wherein the construction process further comprises a step of applying a second magnetizable layer on a bottom side of said support plate while retaining clearance of magnetizable material around each of said print elements to form a gap in a magnetic circuit threading each of said core assemblies upon energization of corresponding ones of said conductors, said second magnetizable layer forming a part of a magnetic flux conduction path of said print head.

5. A print-head according to claim 4 wherein said construction process further comprises a step of adhesively securing said second insulating sheet to said first insulating sheet and to said support plate.

6. A print head comprising:

a two-dimensional array of magnet core assemblies, each of said core assemblies having an axis to be directed toward a magnetic medium upon which printing is to be done by said print head, each of said core assemblies extending along its axis from a print-element portion of relatively small cross-sectional dimensions to a pedestal portion of relatively large cross-sectional dimensions;

a set of x-conductors disposed parallel to one dimension of said array, and interlacing each of said core assemblies;

a set of y-conductors disposed parallel to a second dimension of said array, and interlacing each of said core assemblies; the conductors of each of said sets, upon being selectively energized with electric currents, activating selected ones of said core assemblies to print a mark on said magnetic medium;

a layer of magnetizable material; and a support plate of nonmagnetic electrically-insulating materials securing the print-element portions of the respective core assemblies with high precision at respective locations in said array; and wherein the pedestal portion of one core assembly connects with the pedestal portion of an adjacent core assembly in said array by said layer of magnetizable material which serves as a magnetic flux conduction path;

said print head being constructed by a process comprising the steps of:

constructing a layer of magnetizable material;

forming an array of pedestals of magnetizable material upon a bottom surface of said layer, said step of forming including a step of locating said pedestals with relatively low precision at the locations of said core assemblies in said array;

constructing a first and a second insulating sheet with apertures therein at sites corresponding to the locations of the said pedestal on said layer;

depositing one set of said conductors on a bottom surface of said first insulating sheet;

depositing a second set of said conductors on a bottom surface of said second insulating sheet;

constructing a support plate of nonmagnetic electrically-insulating material with apertures therein positioned with relatively high precision at sites corresponding to the locations of said print elements in said array;

depositing a print-element in each of said apertures of said support plate; and assembling said magnetizable layer and said support plate to both of said insulating sheets in the form of a composite layered structure with the two insulating sheets contiguous each other, and wherein the top surface of said first insulating sheet contacts the bottom surface of said magnetizable layer, and the top surface of said support plate contacts a bottom surface of said second insulating sheet, said pedestals protruding through the apertures of said insulating sheets and between the conductors of said first and said second sets of conductors to contact the respective print elements to form the respective core assemblies.

7. A print head according to claim 6 wherein the construction process further comprises a step of applying a second magnetizable layer on a bottom side of said support plate while retaining clearance of magnetizable material around each of said print elements to form a gap in a magnetic circuit threading each of said core assemblies upon energization of corresponding ones of said conductors, said second magnetizable layer forming a part of a magnetic flux conduction path of said print head.

8. A pring head according to claim 6 wherein said support plate and each of said insulating sheets are formed of a flexible material, said construction process further comprising a step of molding said print head to conform to a shape of a surface of a magnetic medium upon which said print head is to print.

9. A print head according to claim 8 wherein the construction process further comprises a step of applying a second magnetizable layer on a bottom side of said support plate while retaining clearance of magnetizable material around each of said print elements to form an encircling gap in a magnetic circuit threading each of said core assemblies upon energization of corresponding ones of said conductors, said second magnetizable layer forming a part of a magnetic flux conduction path of said print head.

10. A print head according to claim 9 wherein said construction process further comprises a step of adhesively securing said second insulating sheet to said first insulating sheet and to said support plate, said apertures of said insulating sheets being larger than cross-sectional dimensions of said pedestals to allow clearance thereof to permit emplacement of said sheets upon said magnetizable layer.

11. A print head comprising:

a two-dimensional array of magnet core assemblies, each of said core assemblies having an axis to be directed toward a magnetic medium upon which printing is to be done by said print head, each of said core assemblies extending along its axis from a print-element portion of relatively small cross-sectional dimensions to a skirt portion of relatively large cross-sectional dimensions via a pedestal portion of intermediate cross-sectional dimensions;

a set of x-conductors disposed parallel to one dimension of said array, and interlacing each of said core assemblies;

a set of y-conductors disposed parallel to a second dimension of said array, and interlacing each of said core assemblies; the conductors of each of said sets, upon being selectively energized with electric current, activating selected ones of said core assemblies to print a mark on said magnetic medium;

a first sheet of nonmagnetic electrically-insulating material, said first sheet having apertures larger than said pedestals to provide clearance about said pedestals, said first sheet having a top surface engaging with a bottom surface of the skirt portions of each of said core assemblies, one of said sets of conductors being disposed on a bottom surface of said first sheet electrically insulated from said skirt portions of said core assemblies;

a second sheet of nonmagnetic electrically-insulating material having apertures therein larger than said pedestals for providing clearance around said pedestals, a top surface of said second sheet contacting the bottom surface of said first sheet, a second of said sets of conductors being disposed on a bottom surface of said second sheet electrically insulated from said first set of conductors; and a support plate of nonmagnetic electrically-insulating materials securing the print-element portions of the respective core assemblies accurately at respective locations in said array, said support plate having a set of apertures tightly fitting respective ones of said print-element portions of the respective core assemblies; and wherein the skirt portion of one core assembly joins the the skirt portion of an adjacent core assembly in said array to form a layer of magnetizable material to serve as a magnetic flux conduction path.

12. A print head according to claim 11 further comprising a second layer of magnetizable material disposed on a bottom surface of said support plate, said second layer being provided with apertures encircling each of said print-element portions of said core assemblies to provide a gap therewith in the conduction of magnetic flux.

13. A print head according to claim 11 wherein said support plate and said first sheet and said second sheet are constructed of a flexible polyimide material to permit a molding of said print head to fit a surface of a magnetic medium upon which printing is to be done by said print head.

14. A print head according to claim 13 further comprising a second layer of magnetizable material disposed on a bottom surface of said support plate, said second layer being provided with apertures encircling each of said print-element portions of said core assemblies to provide a gap therewith in the conduction of magnetic flux.

15. A print head according to claim 14 wherein said second sheet is adhesively secured to said first sheet and to said support plate.

16. A method for fabricating a print head, the print head comprising:

a two-dimensional array of magnet core assemblies, each of said core assemblies having an axis to be directed toward a magnetic medium upon which printing is to be done by said print head, each of said core assemblies extending along its axis from a print-element portion of relatively small cross-sectional dimensions to a skirt portion of relatively large cross-sectional dimensions via a pedestal portion of intermediate cross-sectional dimensions;

a set of x-conductors disposed parallel to one dimension of said array, and interlacing each of said core assemblies;

a set of y-conductors disposed parallel to a second dimension of said array, and interlacing each of said core assemblies; the conductors of each of each of said sets, upon being selectively energized with electric currents, activating selected ones of said core assemblies to print a mark on said magnetic medium;

a support plate of nonmagnetic electrically-insulating materials securing the print-element portions of the respective core assemblies with high precision at respective locations in said array; and wherein the skirt portion of one core assembly joins the the skirt portion of an adjacent core assembly in said array to form a layer of magnetizable material to serve as a magnetic flux conduction path;

the method comprising the steps of:

constructing a support plate of nonmagnetic electrically-insulating material with apertures therein positioned with relatively high precision at sites corresponding to the locations of said print elements in said array;

constructing first and second insulating sheets with apertures therein located at sites corresponding to the locations of the print elements, the apertures in said insulating sheets being larger than the apertures in said support plate and being formed with a relatively low precision;

depositing first and second ones of said sets of conductors on the bottom sides respectively of said first and of said second insulating sheets, the conductors in each of said sheets being spaced apart from the apertures in respective ones of said sheets;

assembling said support plate, said first sheet with the conductors thereon, and said second sheet with the conductors thereon into a composite layered structure wherein the bottom side of said first sheet contacts the top side of said second sheet and the top side of said support plate contacts the bottom side of said second sheet; and depositing a layer of magnetizable material within the apertures of said support plate to form the print-element portion of each core assembly, further depositing said magnetizable material within the apertures of said second and said first insulating sheets to form the pedestal portions of each of said core assemblies, and continuing depositing said magnetizable material upon the top surface of said first sheet to form the skirt portions of said core assemblies.

17. A method according to claim 16 further comprising a step of applying a second magnetizable layer on a bottom side of said support plate while retaining clearance of magnetizable material around each of said print elements to form an encircling gap in a magnetic circuit threading each of said core assemblies upon energization of corresponding ones of said conductors, said second magnetizable layer forming a part of a magnetic flux conduction path of said print head.

18. A method according to claim 16 wherein said support plate and each of said insulating sheets are formed of a flexible polyimide material, said construction process further comprising a step of molding said print head to conform to a shape of a surface of a magnetic medium upon which said print head is to print.

19. A method according to claim 18 wherein the construction process further comprises a step of applying a second magnetizable layer on a bottom side of said support plate while retaining clearance of magnetizable material around each of said print elements to form an encircling gap in a magnetic circuit threading each of said core assemblies upon energization of corresponding ones of said conductors, said second magnetizable layer forming a part of a magnetic flux conduction path of said print head.

20. A method according to claim 19 wherein said construction process further comprises a step of adhesively securing said second insulating sheet to said first insulating sheet and to said support plate.

21. A method for fabricating a print head, the print head comprising:

a two-dimensional array of magnet core assemblies, each of said core assemblies having an axis to be directed toward a magnetic medium upon which printing is to be done by said print head, each of said core assemblies extending along its axis from a print-element portion of relatively small cross-sectional dimensions to a pedestal portion of relatively large cross-sectional dimensions;

a set of x-conductors disposed parallel to one dimension of said array, and interlacing each of said core assemblies;

a set of y-conductors disposed parallel to a second dimension of said array, and interlacing each of said core assemblies; the conductors of each of said sets, upon being selectively energized with electric currents, activating selected ones of said core assemblies to print a mark on said magnetic medium;

a layer of magnetizable material; and a support plate of nonmagnetic electrically-insulating materials securing the print-element portions of the respective core assemblies with high precision at respective locations in said array; and wherein the pedestal portion of one core assembly connects with the pedestal portion of an adjacent core assembly in said array by said layer of magnetizable material which serves as a magnetic flux conduction path;

the method comprising the steps of:

constructing the layer of magnetizable material;

forming an array of pedestals of magnetizable material upon a bottom surface of said layer, said step of forming including a step of locating said pedestals with relatively low precision at the locations of said core assemblies in said array;

constructing a first and a second insulating sheet with apertures therein at sites corresponding to the locations of the said pedestal on said layer;

depositing one set of said conductors on a bottom surface of said first insulating sheet;

depositing a second set of said conductors on a bottom surface of said second insulating sheet;

constructing a support plate of nonmagnetic electrically-insulating material with apertures therein positioned with relatively high precision at sites corresponding to the locations of said print elements in said array;

depositing a print-element in each of said apertures of said support plate; and assembling said magnetizable layer and said support plate to both of said insulating sheets in the form of a composite layered structure with the two insulating sheets contiguous each other, and wherein the top surface of said first insulating sheet contacts the bottom surface of said magnetizable layer, and the top surface of said support plate contacts a bottom surface of said second insulating sheet, said pedestals protruding through the apertures of said insulating sheets and between the conductors of said first and said second sets of conductors to contact the respective print elements to form the respective core assemblies.

22. A method according to claim 21 further comprising a step of applying a second magnetizable layer on a bottom side of said support plate while retaining clearance of magnetizable material around each of said print elements to form an encircling gap in a magnetic circuit threading each of said core assemblies upon energization of corresponding ones of said conductors, said second magnetizable layer forming a part of a magnetic flux conduction path of said print head.

23. A method according to claim 21 wherein said support plate and each of said insulating sheets are formed of a flexible polyimide material, said construction process further comprising a step of molding said print head to conform to a shape of a surface of a magnetic medium upon which said print head is to print.

24. A method according to claim 23 wherein the construction process further comprises a step of applying a second magnetizable layer on a bottom side of said support plate while retaining clearance of magnetizable material around each of said print elements to form an encircling gap in a magnetic circuit threading each of said core assemblies upon energization of corresponding ones of said conductors, said second magnetizable layer forming a part of a magnetic flux conduction path of said print head.

25. A method according to claim 24 wherein said construction process further comprises a step of adhesively securing said second insulating sheet to said first insulating sheet and to said support plate, said apertures of said insulating sheets being larger than cross-sectional dimensions of said pedestals to allow clearance thereof to permit emplacement of said sheets upon said magnetizable layer.

26. A print head comprising:

a two-dimensional array of magnet core assemblies, each of said core assemblies having an axis to be directed toward a magnetic medium upon which printing is to be done by said print head, each of said core assemblies extending along its axis from a print-element portion of relatively small cross-sectional dimensions to a skirt portion of relatively large cross-sectional dimensions via a pedestal portion of intermediate cross-sectional dimensions;

a set of conductors interlacing each of said core assemblies and, upon being selectively energized with electric currents, activate selected ones of said core assemblies to print a mark on said magnetic medium;

a layer of nonmagnetic electrically-insulating material surrounding said pedestals, said conductors being embedded in said layer of material; and a support plate of nonmagnetic electrically-insulating materials securing the print-element portions of the respective core assemblies accurately at respective locations in said array, said support plate having a set of apertures tightly fitting respective ones of said print-element portions of the respective core assemblies; and wherein the skirt portion of one core assembly joins the the skirt portion of an adjacent core assembly in said array to form a layer of magnetizable material to serve as a magnetic flux conduction path.

27. A print head according to claim 26 wherein the area of said top layer and a spacing between said top layer and said magnetic medium introduce a magnetic reluctance to the flow of flux which is smaller than a value of magnetic reluctance to flux flowing from one of said print elements into said magnetic medium.

28. A print head comprising:

a two-dimensional array of magnet core assemblies, each of said core assemblies having an axis to be directed toward a magnetic medium upon which printing is to be done by said print head, said head including a top layer of magnetizable material, each of said core assemblies extending downwardly along its axis from said top layer to a print-element portion of relatively small cross-sectinal dimensions, an intermediate portion of each of said core assemblies being formed as a pedestal joining said print-element portion to said top layer, said pedestal portion having a larger cross-sectional dimension than said print-element portion;

a set of conductors interlacing each of said core assemblies and, upon being selectively energized with electric currents, activate selected ones of said core assemblies to print a mark on said magnetic medium;

a bottom layer of nonmagnetic electrically-insulating material surrounding said pedestals, said conductors being embedded in said layer of material; and wherein said print-element portions extend through said bottom layer in precisely positioned locations of said two-dimensional array independently of any deviation in position of said pedestals to enable precise printing by said print-head while reducing mechanical tolerances in the construction of said pedestals and said top layer.

29. A print head according to claim 28 wherein the area of said top layer and a spacing between said top layer and said magnetic medium introduce a magnetic reluctance to the flow of flux which is smaller than a value of magnetic reluctance to flux flowing from one of said print elements into said magnetic medium;

30. A print head comprising:

a two-dimensional array of magnet core assemblies, each of said core assemblies having an axis to be directed toward a magnetic medium upon which printing is to be done by said print head, said head including a top layer of magnetizable material, each of said core assemblies extending downwardly along its axis from said top layer to a print-element portion of relatively small cross-sectional dimensions, an intermediate portion of each of said core assemblies being formed as a pedestal joining said print element portion to said top layer, said pedestal portion having a larger cross-sectional dimension than said print-element portion;

a set of conductors interlacing each of said core assemblies and, upon being selectively energized with electric currents, activate selected ones of said core assemblies to print a mark on said magnetic medium;

a bottom layer of nonmagnetic electrically-insulating material surrounding said pedestals, said conductors being embedded in said layer of material; and wherein said print-element portions extend through said bottom layer in precisely positioned locations of said two-dimensional array independently of any deviation in position of said pedestals to enable precise printing by said print-head while reducing mechanical tolerances in the construction of said pedestals and said top layer;

31. A print head according to claim 30, constructed by the process of:

photolithographically developing said print element portions on a bottom surface of a slab of said magnetizable material;

masking said print-element portions;

extracting material from said slab between said print-element portions leaving a set of pedestals joined by a top layer of said magnetizable material of said slab; and introducing a bottom layer of non-magnetic electrically-insulating material between said pedestals and said print element portins; and wherein, said step of introducing the material of said bottom layer includes a step of embedding said electrical conductors within the material of said bottom layer.

32. An electromagnetic head having a common flux returning backplate and an array of writing elements extending from the common backplate, comprising:

(a) addressability resolution means, including an array of large pedestals of ferromagnetic material, individually selectable electrically to provide selection magnetic flux for a pel of the desired image; and (b) imaging resolution means, including an array of small pedestals of ferromagnetic material respectively associated with a related large pedestal in flux transfer relationship from large pedestal through small pedestal to an image receptor;

whereby addressability resolution and imaging resolution are separately provided.

33. An electromagnetic head according to claim 32, wherein said addressing resolution means large pedestals and said imaging resolution means small pedestals are separately machined from a common block of material with the common flux returning backplate.

34. An electromagnetic head according to claim 32, wherein said imaging resolution means includes a support plate which provides dimensionally stable placement of said small pedestals in its plane, wherein said large pedestals of said addressing resolution means have top surfaces, and wherein said small pedestals of said imaging resolution means are placed upon the tops of said large pedestals by assembly of said support plate on the top surfaces of said large pedestals.

35. An electromagnetic head according to claim 33, wherein said support plate includes a surface of wear resistant material.

36. An electromagnetic head according to claim 32, wherein the flux return path from a selected small pedestal includes paths through nonferromagnetic material surrounding the selected small pedestal and unselected small pedestals to the common backplate.

* * * * *